US011538985B2

United States Patent
You et al.

(10) Patent No.: US 11,538,985 B2
(45) Date of Patent: Dec. 27, 2022

(54) METHOD FOR CONFIGURING RECONFIGURABLE PHYSICAL UNCLONABLE FUNCTION BASED ON DEVICE WITH SPIN-ORBIT TORQUE EFFECT

(71) Applicant: HUAZHONG UNIVERSITY OF SCIENCE AND TECHNOLOGY, Hubei (CN)

(72) Inventors: Long You, Hubei (CN); Shuai Zhang, Hubei (CN); Zhen Cao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 351 days.

(21) Appl. No.: 17/031,805

(22) Filed: Sep. 24, 2020

(65) Prior Publication Data
US 2021/0098692 A1    Apr. 1, 2021

(30) Foreign Application Priority Data

Sep. 29, 2019  (CN) .......................... 201910938124.7

(51) Int. Cl.
*H01L 43/06*    (2006.01)
*H01L 43/04*    (2006.01)
(Continued)

(52) U.S. Cl.
CPC .......... *H01L 43/06* (2013.01); *H01F 10/3254* (2013.01); *H01L 27/13* (2013.01);
(Continued)

(58) Field of Classification Search
CPC ....... H01L 43/06; H01L 27/13; H01L 27/285; H01L 43/04; H01L 43/08; H01L 43/14;
(Continued)

(56) References Cited

U.S. PATENT DOCUMENTS

2018/0351082 A1*  12/2018  Sasaki ................. H01F 10/3254
2019/0189175 A1*   6/2019  Park ........................ H01L 43/08
(Continued)

FOREIGN PATENT DOCUMENTS

CN          108321292         7/2018

OTHER PUBLICATIONS

G. Finocchio et al., "Spin-orbit torque based physical unclonable function," Journal of Applied Physics, vol. 128, Issue 3, doi: 10.1063/5.0013408, Jul. 15, 2020, pp. 1-10.

*Primary Examiner* — Alvaro E Fortich
*Assistant Examiner* — Zannatul Ferdous
(74) *Attorney, Agent, or Firm* — JCIP Global Inc.

(57) ABSTRACT

A method for configuring a reconfigurable physical unclonable function (PUF) based on a device with spin-orbit torque (SOT) effect is provided. The disclosure uses SOT or magnetic field to change the magnetic moment. After the current or magnetic field is removed, the magnetic moment returns to the easy axis direction. Under the effect of thermal fluctuation, the magnetic moment is randomly oriented in the easy axis direction. The non-volatile devices are formed into an array, the magnetic moments of all non-volatile devices are randomly distributed after a write operation. The read state can be used as a random code to implement the reconfigurable PUF. The PUF has a simple structure and guarantees security. The random code in the disclosure may be two-state or multi-state, which is related to the number of magnetic domains of the ferromagnetic layer. A large number of challenge response pairs form a strong PUF.

19 Claims, 2 Drawing Sheets

(51) Int. Cl.
  *H04L 9/32*   (2006.01)
  *H01F 10/32*  (2006.01)
  *H01L 27/28*  (2006.01)
  *H01L 27/13*  (2006.01)

(52) U.S. Cl.
  CPC ............ *H01L 27/285* (2013.01); *H01L 43/04* (2013.01); *H04L 9/3278* (2013.01)

(58) Field of Classification Search
  CPC ............ H01F 10/3254; H01F 10/3286; H01F 10/329; H04L 9/3278; H04L 9/0866; G11C 11/22
  See application file for complete search history.

(56) References Cited

U.S. PATENT DOCUMENTS

2020/0106002 A1\* 4/2020 Song ................ H01F 41/302
2020/0185598 A1\* 6/2020 Noh ................. H01F 10/1936

\* cited by examiner

METHOD FOR CONFIGURING RECONFIGURABLE PHYSICAL UNCLONABLE FUNCTION BASED ON DEVICE WITH SPIN-ORBIT TORQUE EFFECT

CROSS-REFERENCE TO RELATED APPLICATION

This application claims the priority benefit of China application serial no. 201910938124.7, filed on Sep. 29, 2019. The entirety of the above-mentioned patent application is hereby incorporated by reference herein and made a part of this specification.

BACKGROUND

Technical Field

The disclosure relates to the field of information security, and more specifically relates to a method for configuring a reconfigurable physical unclonable function (PUF) based on a device with a spin-orbit torque (SOT) effect.

Description of Related Art

The information technology in modern society is rapidly developing. The Internet and Internet of Things technologies involve all aspects of our lives, including clothing, food, housing, transportation, finance, social interaction, etc. When we use the Internet, we also store a lot of personal information on the Internet. Such information is related to aspects such as our privacy or property security. In addition, the rapid development of smart devices, such as smart phones and smart cards, have also been widely used in our lives and production. How to effectively authenticate and encrypt the physical entities has become an important issue in the field of information security. Physical unclonable function (PUF) has been introduced into the field of information security as an effective and high-security encryption method. PUFs utilize process variations and physical stochastics to generate random codes. The random codes are derived from physical randomness, which cannot be copied and has a high degree of security. The PUF is widely used in the fields of key generation and identity authentication.

Currently, the widely used PUFs are Si-based devices, and the PUFs are generally configured using the delay characteristics of transistors. However, PUFs based on delay are easy to crack due to the internal linear characteristics. Therefore, PUFs based on non-volatile memory, for example, magnetic random access memory (MRAM), have been widely researched. However, existing PUFs based on non-volatile memory generally use the randomness of the device during the preparation process to generate random codes, which have fewer challenge response pairs (CPRs) for encryption and are difficult to form a strong PUF.

Patent CN201810239799 discloses a magnetic PUF device and a magnetic PUF equipment, implemented by tuning the interface anisotropy between the CoFeB film and the MgO film. However, the PUF cannot be reconfigured because that the internal randomness comes from the uneven thickness of the MgO film layer, and the thickness will remain unchanged once the PUF is fabricated.

SUMMARY

In view of the defects and improvement requirements of the prior arts, the disclosure provides a method for implementing a reconfigurable physical unclonable function (PUF) based on a device with spin-orbit torque (SOT) effect. The objective is to provide a method to construct a reconfigurable and strong PUF.

In order to achieve the above objective, according to the first aspect of the disclosure, a method for configuring a reconfigurable PUF based on a device with an SOT effect is provided.

The method includes the following steps.

Step S1. A write current is applied between a first pair of bottom electrodes of a non-volatile device in the device with the SOT effect, so that the magnetization state of ferromagnetic layer of the non-volatile device changes from a vertical magnetization state to a horizontal magnetization state.

Step S2. The write current is removed. A read current is applied between the first pair of bottom electrodes of the non-volatile device. An anomalous Hall resistance of the non-volatile device is read.

Step S3. Steps S1 and S2 are repeated for each non-volatile device in the device with the SOT effect. Anomalous Hall resistances of all non-volatile devices are read.

Step S4. A value is assigned to each non-volatile device according to the anomalous Hall resistances of all non-volatile devices, so as to implement the reconfigurable PUF.

The device with the SOT effect is composed of a non-volatile device array. The non-volatile device has a multi-layer film structure, which sequentially includes from bottom to top: a spin current generation layer, the first pair of bottom electrodes, and a second pair of bottom electrodes made of heavy metal materials or topological insulators; the ferromagnetic layer made of a ferromagnetic material; an insulating layer made of an insulating material; and a cap layer made of a heavy metal material. The easy axis direction of the magnetic moment of the ferromagnetic layer is in the vertical direction. The first pair of bottom electrodes and the second pair of bottom electrodes are orthogonal to each other.

In order to achieve the above objective, according to the second aspect of the disclosure, a method for configuring a reconfigurable PUF based on a device with an SOT effect is provided. The method includes the following steps.

Step S1. An external magnetic field is applied to a non-volatile device in the device with the SOT effect, so that a magnetization state of a ferromagnetic layer of the non-volatile device changes from a vertical magnetization state to a horizontal magnetization state.

Step S2. The external magnetic field is removed. A read current is applied between a first pair of bottom electrodes of the non-volatile device. An anomalous Hall resistance of the non-volatile device is read.

Step S3. Steps S1 and S2 are repeated for each non-volatile device in the device with the SOT effect. Anomalous Hall resistances of all non-volatile devices are read.

Step S4. A value is assigned to each non-volatile device according to the read anomalous Hall resistances of all non-volatile devices, so as to implement the reconfigurable PUF.

The device with the SOT effect is composed of a non-volatile device array. The non-volatile device has a multi-layer film structure, which sequentially includes from bottom to top: a spin current generation layer, the first pair of bottom electrodes, and a second pair of bottom electrodes made of heavy metal materials or topological insulators; the ferromagnetic layer made of a ferromagnetic material; an insulating layer made of an insulating material; and a cap layer made of a heavy metal material. The easy axis direction of the magnetic moment of the ferromagnetic layer is in the vertical direction. The first pair of bottom electrodes and the second pair of bottom electrodes are orthogonal to each other.

In order to achieve the above objective, according to the third aspect of the disclosure, a method for configuring a reconfigurable PUF based on a device with an SOT effect is provided. The method includes the following steps.

Step S1. A write current is applied between two bottom electrodes of a non-volatile device in the device with the SOT effect, so that a magnetization state of a first ferromagnetic layer of the non-volatile device changes from a vertical magnetization state to a horizontal magnetization state.

Step S2. The write current is removed. A read current is applied between an upper electrode and any bottom electrode of the non-volatile device. A resistance of the non-volatile device is read.

Step S3. Steps S1 and S2 are repeated for each non-volatile device in the device with the SOT effect. The resistances of all non-volatile devices are read.

Step S4. A value is assigned to each non-volatile device according to the read resistances of all non-volatile devices, so as to implement the reconfigurable PUF.

The device with the SOT effect is composed of a non-volatile device array. The non-volatile device has a multi-layer film structure, which sequentially includes from bottom to top: a spin current generation layer, a first bottom electrode, and a second bottom electrode made of heavy metal materials or topological insulators, the first ferromagnetic layer made of a ferromagnetic material, a non-magnetic layer made of an insulating material or a non-magnetic metal material, a pinned second ferromagnetic layer made of a ferromagnetic material, a pinning layer made of an anti-ferromagnetic material, a cap layer made of a heavy metal material, and the upper electrode made of a conductive material. The easy axis directions of the magnetic moments of the first ferromagnetic layer and the pinned second ferromagnetic layer are in the vertical direction.

To achieve the above objective, according to the fourth aspect of the disclosure, a method for configuring a reconfigurable PUF based on a device with an SOT effect is provided. The method includes the following steps.

Step S1. An external magnetic field is applied to a non-volatile device in the device with the SOT effect, so that a magnetization state of a first ferromagnetic layer of the non-volatile device changes from a vertical magnetization state to a horizontal magnetization state.

Step S2. The external magnetic field is removed. A read current is applied between an upper electrode and a bottom electrode of the non-volatile device. A resistance of the non-volatile device is read.

Step S3. Steps S1 and S2 are repeated for each non-volatile device in the device with the SOT effect. Resistances of all non-volatile devices are read.

Step S4. A value is assigned to each non-volatile device according to the read resistances of all non-volatile devices, so as to implement the reconfigurable PUF.

The device with the SOT effect is composed of a non-volatile device array. The non-volatile device has a multi-layer film structure, which sequentially includes from bottom to top: a spin current generation layer, a first bottom electrode, and a second bottom electrode made of heavy metal materials or topological insulators, the first ferromagnetic layer made of a ferromagnetic material, a non-magnetic layer made of an insulating material or a non-magnetic metal material, a pinned second ferromagnetic layer made of a ferromagnetic material, a pinning layer made of an anti-ferromagnetic material, a cap layer made of a heavy metal material, and the upper electrode made of a conductive material. The easy axis directions of the magnetic moments of the first ferromagnetic layer and the pinned second ferromagnetic layer are in the vertical direction.

Specifically, the current density of the write current is greater than or equal to $10^6$ A/cm$^2$ (Ampere per centimeter), and the current density of the read current is less than $10^5$ A/cm$^2$.

Specifically, the external magnetic field is parallel to the direction of the ferromagnetic layer and the magnetic field strength is greater than the magnetic anisotropy field of the ferromagnetic layer.

Specifically, when the non-magnetic layer is made of an insulating material that can be used for electron tunneling, the first ferromagnetic layer, the non-magnetic layer, and the pinned second ferromagnetic layer form a magnetic tunnel junction (MTJ) structure. The resistance of the non-volatile device is read according to the tunnel magnetoresistance (TMR) effect and Ohm's law. When the non-magnetic layer is made of a non-magnetic metal material, the first ferromagnetic layer, the non-magnetic layer, and the pinned second ferromagnetic layer form a spin valve structure. The resistance of the non-volatile device is read according to the giant magnetoresistance (GMR) effect and Ohm's law.

Specifically, the material of the non-magnetic layer is MgO, Al$_2$O$_3$, or Cu.

Specifically, the number of resistances of the non-volatile devices increases with the number of magnetic domains, which is specifically as follows.

In the case of a single magnetic domain, there are two types of resistances. The low resistance state is assigned with a value of 0 and the high resistance state is assigned with a value of 1.

In the case of dual magnetic domains, there are four types of resistances, which are sequentially assigned with values of 00, 01, 10, and 11 from small to large.

In order to achieve the above objective, according to the fifth aspect of the disclosure, a computer-readable storage medium is provided. The computer-readable storage medium is stored with a computer program. When the computer program is executed by a processor, the method for configuring the reconfigurable PUF based on the device with the SOT effect according to the above aspects is implemented.

In general, the following beneficial effects can be achieved through the above technical solutions conceived by the disclosure.

(1) The disclosure uses the thermal fluctuation interference to enable the randomness of the orientation of the magnetization direction of the magnetic material, and uses the SOT or the magnetic field to change the magnetic moment, so that the magnetic moment deviates from the easy axis direction thereof. After the current or magnetic field is removed, the magnetic moment returns to the easy axis direction. Under the interference effect of thermal fluctuation, the magnetic moment is randomly oriented in the easy axis direction. The non-volatile devices are formed into an array ' the magnetic moments of all non-volatile devices are randomly distributed after a write operation. The read state may be used as a random code to prepare the reconfigurable PUF. The PUF has a simple structure and guarantees randomness, that is, security.

(2) The random code in the disclosure may be two-state or multi-state, which is related to the number of magnetic domains of the ferromagnetic layer, and the length thereof is related to the number of devices. When the non-volatile device has a single magnetic domain, the total length of the random code is $2^n$. When the non-volatile device has dual magnetic domains, the total length of the random code is $4^n$. A large number of challenge response pairs (CPRs) are extracted from a small number of non-volatile devices to form the strong PUF.

DETAILED DESCRIPTION OF DISCLOSED EMBODIMENTS

For the objective, technical solutions, and advantages of the disclosure to be clearer, the disclosure is further described in detail below with reference to the accompanying drawings and the embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

Figure 1:
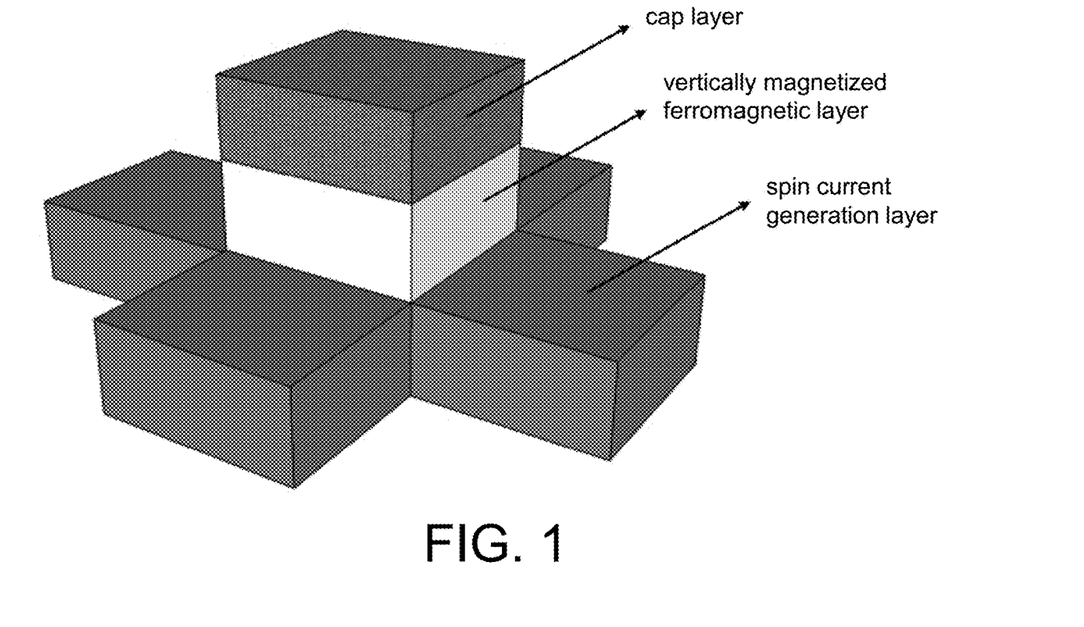
FIG. 1 is a schematic diagram of a structure of a first device with a spin-orbit torque (SOT) effect in the prior art.

As shown in FIG. 1, the prior art discloses a device with a spin-orbit torque (SOT) effect based on a ferromagnetic material. The device is composed of a non-volatile device array. The non-volatile device has a multilayer film structure, which sequentially includes from bottom to top: a spin current generation layer, the first pair of bottom electrodes, and a second pair of bottom electrodes made of heavy metal materials or topological insulators; a ferromagnetic layer made of a ferromagnetic material; an insulating layer made of an insulating material; and a cap layer made of a heavy metal material. The easy axis direction of the magnetic moment of the ferromagnetic layer is in the vertical direction. The first pair of bottom electrodes and the second pair of bottom electrodes are orthogonal to each other.

Specifically, the spin current generation layer is a hall bar structure, and the film surface thereof is cross-shaped. The film surfaces of the ferromagnetic layer, the insulating layer, and the cap layer are nanometer-sized rectangles or circles, and are sequentially stacked on a cross-shaped intersection portion of the spin current generation layer.

Embodiment 1 of the disclosure provides a method for configuring a reconfigurable PUF based on a device with an SOT effect. The method includes the following steps.

Step S1. A write current is applied between a first pair of bottom electrodes of a non-volatile device in the device with the SOT effect, so that a magnetization state of a ferromagnetic layer of the non-volatile device changes from a vertical magnetization state to a horizontal magnetization state.

Step S2. The write current is removed. A read current is applied between the first pair of bottom electrodes of the non-volatile device. An anomalous Hall resistance of the non-volatile device is read.

Step S3. Steps S1 and S2 are repeated for each non-volatile device in the device with the SOT effect. Anomalous Hall resistances of all non-volatile devices are read.

Step S4. A value is assigned to each non-volatile device according to the read anomalous Hall resistances of all non-volatile devices, so as to implement the reconfigurable PUF.

In Step S1, the write current is applied between the first pair of bottom electrodes of the non-volatile device in the device with the SOT effect, so that the magnetization state of the ferromagnetic layer of the non-volatile device changes from the vertical magnetization state to the horizontal magnetization state.

The write current is applied between the first pair of bottom electrodes. When the current flows through the spin current generation layer, the spin current generation layer generates a spin current perpendicular to the ferromagnetic layer due to the spin-orbit coupling effect. The spin current acts on the vertical magnetic moment and pulls the magnetic moment to the horizontal direction.

In order to ensure the SOT effect, the write current path applied to the spin current generation layer needs to be parallel to the ferromagnetic layer and be straight. The current density of the write current is greater than or equal to $10^6$ A/cm$^2$, so that the magnetization state of the ferromagnetic layer of the non-volatile device changes from the vertical magnetization state to the horizontal magnetization state. Since the disclosure implements the reconfigurable PUF based on the change of the magnetization state of the ferromagnetic material, the material is less depleted and has good durability. The write current may be two to three orders of magnitude greater than the read current, the probability of misoperation is small, and the device has good stability.

The magnetization state in the embodiment includes: a vertical upward state, a vertical downward state, a horizontal forward state, and a horizontal backward state.

In Step S2, the write current is removed. The read current is applied between the first pair of bottom electrodes of the non-volatile device. The anomalous Hall resistance of the non-volatile device is read.

After the write current is removed, the magnetic moment of the ferromagnetic layer returns to the vertical direction under the action of the vertical magnetic anisotropy provided by the insulating layer. During the process of the magnetic moment returning to the vertical state, under the action of thermal disturbance, the magnetic moment randomly selects from the two directions of vertical upward and vertical downward.

According to the anomalous Hall effect, the read current is applied to the first pair of bottom electrodes of the non-volatile device, and the Hall voltage of the non-volatile device is read on the second pair of bottom electrodes using the anomalous Hall effect, thereby calculating the anomalous Hall resistance of the non-volatile device, which can reflect the magnetization state of the ferromagnetic layer of the non-volatile device. That is, the anomalous Hall resistance being positive indicates that the magnetization state is vertical upward, and the anomalous Hall resistance being negative indicates that the magnetization state is vertical downward.

Similarly, the read current path needs to be parallel to the ferromagnetic layer and be straight. The current density of the read current is less than $10^5$ A/cm$^2$. At this time, the read magnetization state of the ferromagnetic layer of the non-volatile device is a vertical upward state or a vertical downward state.

In Step S3, Steps S1 and S2 are repeated for each non-volatile device in the device with the SOT effect. Anomalous Hall resistances of all non-volatile devices are read.

In Step S4, a value is assigned to each non-volatile device according to the read anomalous Hall resistances of all non-volatile devices, so as to implement the reconfigurable PUF.

The number of resistances of the device increases as the number of magnetic domains increases. In the case of a single magnetic domain, there are two types of resistances, the low resistance state is assigned with a value of 0 and the high resistance state is assigned with a value of 1. In the case of dual magnetic domains, there are four types of resistances, which are sequentially assigned with values of 00, 01, 10, and 11 from small to large, so that the resistance of the device no longer has only two states of "0" and "1", thereby implementing a multi-state reconfigurable PUF. Since the magnetization state of the ferromagnetic material has a fast reversal speed and a short time, the reconfigurable PUF device provided by the disclosure has faster reading and writing performance.

In the device with the SOT effect, the magnetic moments of all non-volatile devices are randomly distributed after a write operation. The read state may be used as a random code.

By repeating Steps S1 to S4, the PUF may produce a new binary password, which is not associated with the old binary password, thereby implementing the reconfiguration of the PUF.

Figure 2:
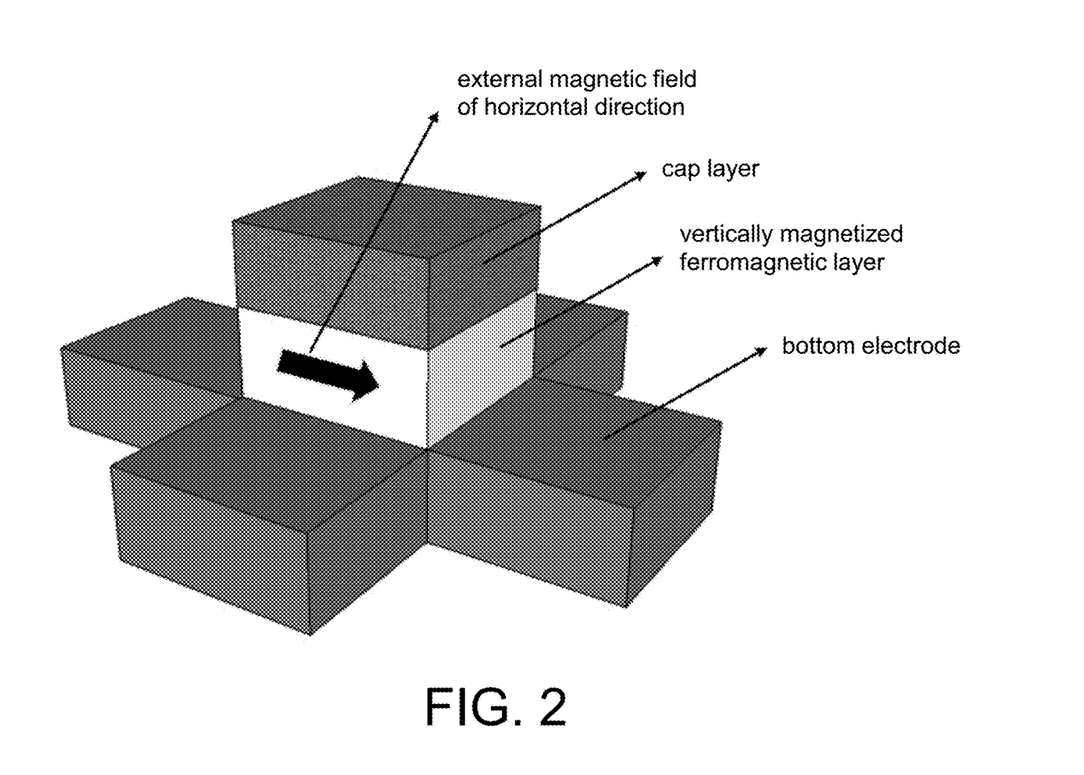
FIG. 2 is a schematic diagram of a method for configuring a reconfigurable physical unclonable function (PUF) based on a device with an SOT effect according to Embodiment 2 of the disclosure.

As shown in FIG. 2, Embodiment 2 of the disclosure provides a method for configuring a reconfigurable PUF based on a device with an SOT effect. The method includes the following steps.

Step S1. An external magnetic field is applied to the device with the SOT effect, so that a magnetization state of a ferromagnetic layer of a non-volatile device in the device with the SOT changes from a vertical magnetization state to a horizontal magnetization state.

Step S2. The external magnetic field is removed. A read current is applied between a first pair of bottom electrodes of the non-volatile device. An anomalous Hall resistance of the non-volatile device is read.

Step S3. Steps S1 and S2 are repeated for each non-volatile device in the device with the SOT effect. Anomalous Hall resistances of all non-volatile devices are read.

Step S4. A value is assigned to each non-volatile device according to the read anomalous Hall resistances of all non-volatile devices, so as to implement the reconfigurable PUF.

Embodiment 2 is similar to Embodiment 1, except that an external magnetic field is applied instead of the write current, that is, a planar magnetic field is directly used to randomly change the magnetic moment. The external magnetic field is parallel to the direction of the ferromagnetic layer and the magnetic field strength is greater than the magnetic anisotropy field of the ferromagnetic layer.

Figure 3:
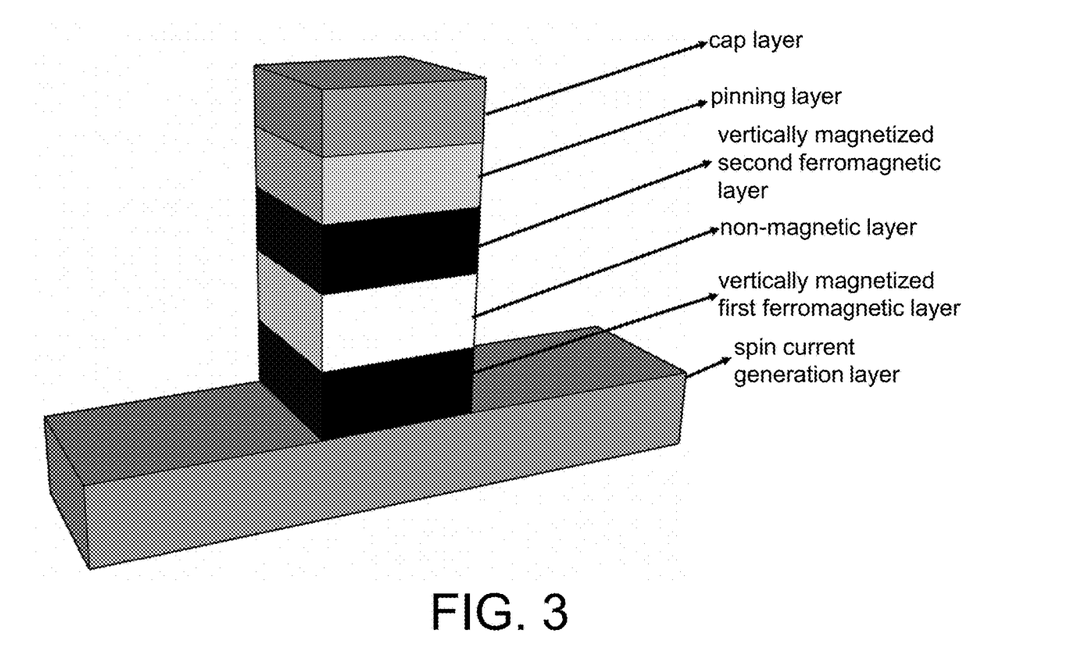
FIG. 3 is a schematic diagram of a structure of a second device with an SOT effect in the prior art.

As shown in FIG. 3, the prior art also discloses a device with an SOT effect. The device is composed of a non-volatile device array. The non-volatile device has a multi-layer film structure, which sequentially includes from bottom to top: a spin current generation layer, a first bottom electrode, and a second bottom electrode made of heavy metal materials or topological insulators, a first ferromagnetic layer made of a ferromagnetic material, a non-magnetic layer made of an insulating material or a non-magnetic metal material, a pinned second ferromagnetic layer made of a ferromagnetic material, a pinning layer made of an anti-ferromagnetic material, a cap layer made of a heavy metal material, and an upper electrode made of a conductive material. The easy axis directions of the magnetic moments of the first ferromagnetic layer and the second ferromagnetic layer are in the vertical direction.

When the non-magnetic layer is made of an insulating material that may be used for electron tunneling, the first ferromagnetic layer, the non-magnetic layer, and the pinned second ferromagnetic layer form a magnetic tunnel junction (MTJ) structure. When the non-magnetic layer is made of a non-magnetic metal material, the first ferromagnetic layer, the non-magnetic layer, and the pinned second ferromagnetic layer form a spin valve structure. The material of the non-magnetic layer is MgO, $Al_2O_3$, or Cu.

Specifically, the film surfaces of the first ferromagnetic layer, the non-magnetic layer, the pinned second ferromagnetic layer, the pinning layer, and the cap layer are polygons or ellipses with the same size. The film surface of the spin current generation layer is greater than the film surfaces of other layers.

Figure 4:
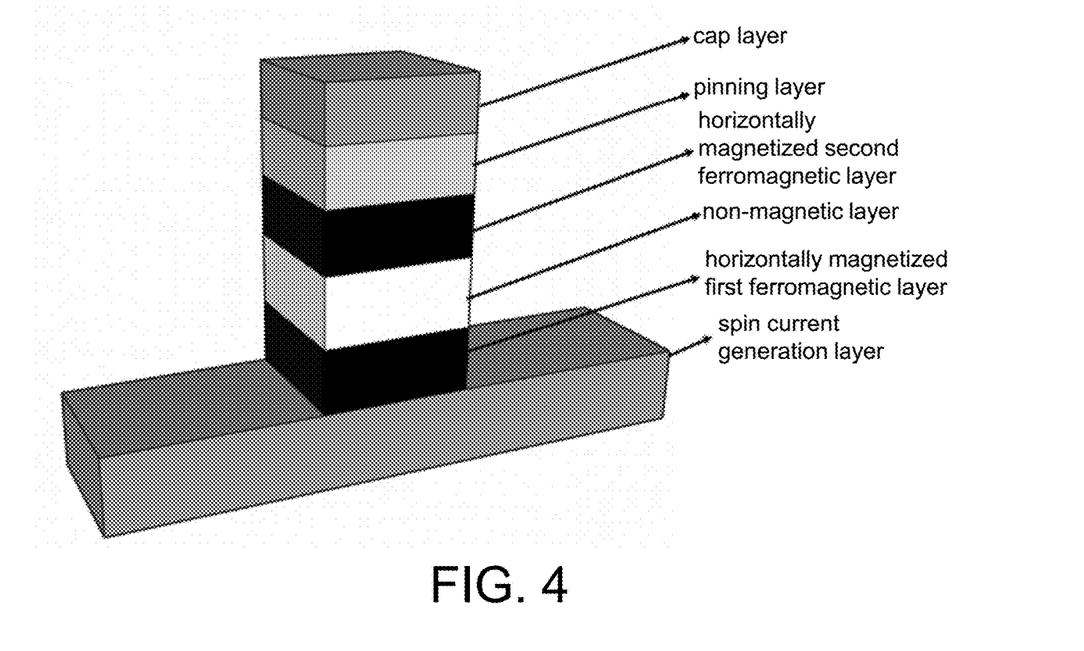
FIG. 4 is a schematic diagram of a structure of a third device with an SOT effect in the prior art.

As shown in FIG. 4, Embodiment 3 of the disclosure provides a method for configuring a reconfigurable PUF based on a device with an SOT effect. The method includes the following steps.

Step S1. A write current is applied between two bottom electrodes of a non-volatile device in the device with the SOT effect, so that a magnetization state of a first ferromagnetic layer of the non-volatile device changes from a vertical magnetization state to a horizontal magnetization state.

Step S2. The write current is removed. A read current is applied between an upper electrode and any bottom electrode of the non-volatile device. A resistance of the non-volatile device is read.

Step S3. Steps S1 and S2 are repeated for each non-volatile device in the device with the SOT effect. The resistances of all non-volatile devices are read.

Step S4. A value is assigned to each non-volatile device according to the read resistances of all non-volatile devices, so as to implement the reconfigurable PUF.

In Step S1, the write current is applied between the two bottom electrodes of the non-volatile device in the device with the SOT effect, so that the magnetization state of the first ferromagnetic layer of the non-volatile device changes from the vertical magnetization state to the horizontal magnetization state.

Based on the SOT effect, the write current is applied between a first bottom electrode and a second bottom electrode of the reconfigurable PUF. The current density of the write current is greater than or equal to $10^6$ $A/cm^2$. The spin current is generated in the spin current generation layer. The torque of the SOT pulls the magnetic moment in the first ferromagnetic layer to the hard axis direction.

In Step S2, the write current is removed. The read current is applied between the upper electrode and any bottom electrode of the non-volatile device. The resistance of the non-volatile device is read.

The read current is applied between the first bottom electrode/the second bottom electrode and the upper electrode. The current density of the read current is less than $10^5$ $A/cm^2$.

After the write current is removed, the magnetic moment of the first ferromagnetic layer returns to the easy axis direction. When returning to the easy axis direction, the magnetic moment randomly selects from two collinear directions under the action of thermal disturbance. After the random process is completed, the read current is applied between the first bottom electrode/the second bottom electrode and the upper electrode to detect the magnetization state of the first ferromagnetic layer.

When the non-magnetic layer is made of an insulating material that can be used for electron tunneling, for example, MgO, the first ferromagnetic layer, the non-magnetic layer, and the pinned second ferromagnetic layer form the MTJ structure. The resistance of the non-volatile device is read according to the tunnel magnetoresistance (TMR) effect and Ohm's law.

When the non-magnetic layer is made of a non-magnetic metal material, the first ferromagnetic layer, the non-magnetic layer, and the pinned second ferromagnetic layer form the spin valve structure. The resistance of the non-volatile device is read according to the giant magnetoresistance (GMR) effect and Ohm's law.

In Step S3, Steps S1 and S2 are repeated for each non-volatile device in the device with the SOT effect. The resistances of all non-volatile devices are read.

In Step S4, a value is assigned to each non-volatile device according to the read resistances of all non-volatile devices, so as to implement the reconfigurable PUF.

The value assigning process of Embodiment 3 is the same as that of Embodiment 1.

Embodiment 4 of the disclosure provides a method for configuring a reconfigurable PUF based on a device with an SOT effect. The method includes the following steps.

Step S1. An external magnetic field is applied parallel to the direction of the ferromagnetic layer and the magnetic field strength is greater than the external magnetic field of the anisotropic field of the first ferromagnetic layer to the device with the SOT effect, so that the magnetization state of the first ferromagnetic layer of the non-volatile device changes from a vertical magnetization state to a horizontal magnetization state.

Step S2. The external magnetic field is removed. A read current is applied between an upper electrode and a bottom electrode of the non-volatile device. A resistance of the non-volatile device is read.

Step S3. Steps S1 and S2 are repeated for each non-volatile device in the device with the SOT effect. Resistances of all non-volatile devices are read.

Step S4. A value is assigned to each non-volatile device according to the read resistances of all non-volatile devices, so as to implement the reconfigurable PUF.

When an external magnetic field with a magnetic field strength greater than the anisotropy of the first ferromagnetic layer is applied, the magnetic moment of the first ferromagnetic layer may also be pulled to the hard axis direction. After the magnetic field is removed, the magnetic moment returns to the easy axis direction. When the first ferromagnetic layer is magnetized vertically, the direction of the external magnetic field is horizontal.

As shown in FIG. 4, the prior art also discloses a device with an SOT effect. The non-volatile device has a multilayer film structure, which sequentially includes from bottom to top: a spin current generation layer, a first bottom electrode, and a second bottom electrode made of heavy metal materials or topological insulators, a first ferromagnetic layer made of a ferromagnetic material, a non-magnetic layer made of an insulating material or a non-magnetic metal material, a pinned second ferromagnetic layer made of a ferromagnetic material, a pinning layer made of an antiferromagnetic material, a cap layer made of a heavy metal material, and an upper electrode made of a conductive material. The easy axis directions of the magnetic moments of the first ferromagnetic layer and the second ferromagnetic layer are in the horizontal direction.

The operation method of Embodiment 5 of the disclosure is the same as that of Embodiment 3. When the first ferromagnetic layer is in-plane polarized, the polarization direction of the spin current is in the vertical direction. The devices are assembled into an array to prepare a reconfigurable PUF.

The operation method of Embodiment 6 of the disclosure is the same as that of Embodiment 4. When the first ferromagnetic layer is in-plane polarized, the direction of the external magnetic field is in the vertical direction. The devices are assembled into an array to prepare a reconfigurable PUF.

After the PUF devices of the same type are formed into an array, the array is used to prepare a reconfigurable PUF array. The magnetic moments of all devices are randomly distributed after a write operation. The read state may be used as a random code. The random password may be two-state or multi-state, which is related to the number of magnetic domains of the ferromagnetic layer, and the length thereof is related to the number of devices. Specifically, when a number m of magnetic domains of the ferromagnetic layer is 1, that is, when the ferromagnetic layer has a single magnetic domain, each device may generate two random states. In the case of unlimited resets, the total length of all passwords is $2^n$, where n represents the number of devices. When the device has dual magnetic domains, that is, when m is 2 and the ferromagnetic layer has dual magnetic domains, each device may produce four states. In the case of unlimited resets, the total length of all passwords is $4^n$. When the device scale does not have to be large, for example, when n=100, the total key length may reach $2^{100}$ (for a device having single magnetic domain) and $4^{100}$ (for a device having dual magnetic domains). Such kind of password has a high degree of security and can hardly be cracked, which may be used in the field of information encryption for identity authentication or key generation.

All the above step operations may be implemented by a circuit description language, so there is a computer-readable storage medium. The computer-readable storage medium is stored with a computer program, which may implement all the above step operations.

Since all the above devices are non-volatile devices, device information may be retained for a long time after a write current operation, and only a small current is required to read data, which has high stability and low bit error rate. Under special conditions, the write current or the external magnetic field may be used to reset all units. Since the state of the device is randomly selected each time the device is operated, the device has very high security. In addition, the device designed by the disclosure has small size and simple circuit, which may be integrated on a large scale.

Persons skilled in the art may easily understand that the above descriptions are only preferred embodiments of the disclosure and are not intended to limit the disclosure. Any modification, equivalent replacement, improvement, etc. made within the spirit and principle of the disclosure should be included in the protection scope of the disclosure.

What is claimed is:

1. A method for configuring a reconfigurable physical unclonable function (PUF) based on a device with a spin-orbit torque (SOT) effect, comprising:
   Step S1 of applying a write current between a first pair of bottom electrodes of a non-volatile device in the device with the SOT effect, so that a magnetization state of a ferromagnetic layer of the non-volatile device changes from a vertical magnetization state to a horizontal magnetization state;
   Step S2 of removing the write current, applying a read current between the first pair of bottom electrodes of the non-volatile device, and reading an anomalous Hall resistance of the non-volatile device;

Step S3 of repeating Steps S1 and S2 for each non-volatile device in the device with the SOT effect, and reading anomalous Hall resistances of all non-volatile devices; and Step S4 of assigning a value to each non-volatile device according to the read anomalous Hall resistances of all the non-volatile devices, so as to implement the reconfigurable PUF, wherein the device with the SOT effect is composed of a non-volatile device array, the non-volatile device has a multilayer film structure, which sequentially comprises from bottom to top: a spin current generation layer, the first pair of bottom electrodes, and a second pair of bottom electrodes made of heavy metal materials or topological insulators; the ferromagnetic layer made of a ferromagnetic material; an insulating layer made of an insulating material; and a cap layer made of a heavy metal material, an easy axis direction of a magnetic moment of the ferromagnetic layer is in a vertical direction, and the first pair of bottom electrodes and the second pair of bottom electrodes are orthogonal to each other.

2. A method for configuring a reconfigurable PUF physical unclonable function (PUF) based on a device with a spin-orbit torque (SOT) effect, comprising:

Step S1 of applying an external magnetic field to a non-volatile device in the device with the SOT effect, so that a magnetization state of a ferromagnetic layer of the non-volatile device changes from a vertical magnetization state to a horizontal magnetization state;

Step S2 of removing the external magnetic field, applying a read current between a first pair of bottom electrodes of the non-volatile device, and reading an anomalous Hall resistance of the non-volatile device;

Step S3 of repeating Steps S1 and S2 for each non-volatile device in the device with the SOT effect, and reading anomalous Hall resistances of all non-volatile devices; and Step S4 of assigning a value to each non-volatile device according to the read anomalous Hall resistances of all the non-volatile devices, so as to implement the reconfigurable PUF, wherein the device with the SOT effect is composed of a non-volatile device array, the non-volatile device has a multilayer film structure, which sequentially comprises from bottom to top: a spin current generation layer, the first pair of bottom electrodes, and a second pair of bottom electrodes made of heavy metal materials or topological insulators; the ferromagnetic layer made of a ferromagnetic material; an insulating layer made of an insulating material; and a cap layer made of a heavy metal material, an easy axis direction of a magnetic moment of the ferromagnetic layer is in a vertical direction, and the first pair of bottom electrodes and the second pair of bottom electrodes are orthogonal to each other.

3. A method for configuring a reconfigurable physical unclonable function (PUF) based on a device with a spin-orbit torque (SOT) effect, comprising:

Step S1 of applying a write current between two bottom electrodes of a non-volatile device in the device with the SOT effect, so that a magnetization state of a first ferromagnetic layer of the non-volatile device changes from a vertical magnetization state to a horizontal magnetization state;

Step S2 of removing the write current, applying a read current between an upper electrode and any one of the bottom electrodes of the non-volatile device, and reading a resistance of the non-volatile device;

Step S3 of repeating Steps S1 and S2 for each non-volatile device in the device with the SOT effect, and reading resistances of all non-volatile devices; and Step S4 of assigning a value to each non-volatile device according to the read resistances of all the non-volatile devices, so as to implement the reconfigurable PUF, wherein the device with the SOT effect is composed of a non-volatile device array, the non-volatile device has a multilayer film structure, which sequentially comprises from bottom to top: a spin current generation layer, a first bottom electrode, and a second bottom electrode made of heavy metal materials or topological insulators; the first ferromagnetic layer made of a ferromagnetic material; a non-magnetic layer made of an insulating material or a non-magnetic metal material; a pinned second ferromagnetic layer made of a ferromagnetic material; a pinning layer made of an antiferromagnetic material; a cap layer made of a heavy metal material; and the upper electrode made of a conductive material, and easy axis directions of magnetic moments of the first ferromagnetic layer and the pinned second ferromagnetic layer are in a vertical direction.

4. A method for configuring a reconfigurable physical unclonable function (PUF) based on a device with a spin-orbit torque (SOT) effect, comprising:

Step S1 of applying an external magnetic field to a non-volatile device in the device with the SOT effect, so that a magnetization state of a first ferromagnetic layer of the non-volatile device changes from a vertical magnetization state to a horizontal magnetization state;

Step S2 of removing the external magnetic field, applying a read current between an upper electrode and a bottom electrode of the non-volatile device, and reading a resistance of the non-volatile device;

Step S3 of repeating Steps S1 and S2 for each non-volatile device in the device with the SOT effect, and reading resistances of all non-volatile devices; and Step S4 of assigning a value to each non-volatile device according to the read resistances of all the non-volatile devices, so as to implement the reconfigurable PUF, wherein the device with the SOT effect is composed of a non-volatile device array, the non-volatile device has a multilayer film structure, which sequentially comprises from bottom to top: a spin current generation layer, a first bottom electrode, and a second bottom electrode made of heavy metal materials or topological insulators; the first ferromagnetic layer made of a ferromagnetic material; a non-magnetic layer made of an insulating material or a non-magnetic metal material; a pinned second ferromagnetic layer made of a ferromagnetic material; a pinning layer made of an antiferromagnetic material; a cap layer made of a heavy metal material; and the upper electrode made of a conductive material, and easy axis directions of magnetic moments of the first ferromagnetic layer and the pinned second ferromagnetic layer are in a vertical direction.

5. The method according to claim 1, wherein a current density of the write current is greater than or equal to $10^6$ A/cm$^2$ (Ampere per centimeter) and a current density of the read current is less than $10^5$ A/cm$^2$.

6. The method according to claim 3, wherein a current density of the write current is greater than or equal to $10^6$ A/cm$^2$ (Ampere per centimeter) and a current density of the read current is less than $10^5$ A/cm$^2$.

7. The method according to claim 2, wherein the external magnetic field is parallel to a direction of the ferromagnetic layer and a magnetic field strength is greater than an anisotropic field of the ferromagnetic layer.

8. The method according to claim 4, wherein the external magnetic field is parallel to a direction of the first ferromagnetic layer and a magnetic field strength is greater than an anisotropic field of the ferromagnetic layer.

9. The method according to claim 3, wherein when the non-magnetic layer is made of an insulating material used for electron tunneling, the first ferromagnetic layer, the non-magnetic layer, and the pinned second ferromagnetic layer form a magnetic tunnel junction (MTJ) structure, and the resistance of the non-volatile device is read according to a tunnel magnetoresistance (TMR) effect and Ohm's law; and when the non-magnetic layer is made of a non-magnetic metal material, the first ferromagnetic layer, the non-magnetic layer, and the pinned second ferromagnetic layer form a spin valve structure, and the resistance of the non-volatile device is read according to a giant magnetoresistance (GMR) effect and Ohm's law.

10. The method according to claim 4, wherein when the non-magnetic layer is made of an insulating material used for electron tunneling, the first ferromagnetic layer, the non-magnetic layer, and the pinned second ferromagnetic layer form a magnetic tunnel junction (MTJ) structure, and the resistance of the non-volatile device is read according to a tunnel magnetoresistance (TMR) effect and Ohm's law; and when the non-magnetic layer is made of a non-magnetic metal material, the first ferromagnetic layer, the non-magnetic layer, and the pinned second ferromagnetic layer form a spin valve structure, and the resistance of the non-volatile device is read according to a giant magnetoresistance (GMR) effect and Ohm's law.

11. The method according to claim 9, wherein a material of the non-magnetic layer is MgO, Al$_2$O$_3$, or Cu.

12. The method according to claim 1, wherein a number of resistances of the non-volatile device increases as a number of magnetic domains increases, specifically as follows:
   in a case of a single magnetic domain, there are two types of resistances, wherein a low resistance state is assigned with a value of 0 and a high resistance state is assigned with a value of 1; and
   in a case of dual magnetic domains, there are four types of resistances, which are sequentially assigned with values of 00, 01, 10, and 11 from small to large.

13. The method according to claim 2, wherein a number of resistances of the non-volatile device increases as a number of magnetic domains increases, specifically as follows:
   in a case of a single magnetic domain, there are two types of resistances, wherein a low resistance state is assigned with a value of 0 and a high resistance state is assigned with a value of 1; and
   in a case of dual magnetic domains, there are four types of resistances, which are sequentially assigned with values of 00, 01, 10, and 11 from small to large.

14. The method according to claim 3, wherein a number of resistances of the non-volatile device increases as a number of magnetic domains increases, specifically as follows:
   in a case of a single magnetic domain, there are two types of resistances, wherein a low resistance state is assigned with a value of 0 and a high resistance state is assigned with a value of 1; and
   in a case of dual magnetic domains, there are four types of resistances, which are sequentially assigned with values of 00, 01, 10, and 11 from small to large.

15. The method according to of claim 4, wherein a number of resistances of the non-volatile device increases as a number of magnetic domains increases, specifically as follows:
   in a case of a single magnetic domain, there are two types of resistances, wherein a low resistance state is assigned with a value of 0 and a high resistance state is assigned with a value of 1; and
   in a case of dual magnetic domains, there are four types of resistances, which are sequentially assigned with values of 00, 01, 10, and 11 from small to large.

16. A computer-readable storage medium, wherein the computer-readable storage medium is stored with a computer program, wherein when the computer program is executed by a processor, the method for configuring the reconfigurable PUF based on the device with the SOT effect according to claim 1 is implemented.

17. A computer-readable storage medium, wherein the computer-readable storage medium is stored with a computer program, wherein when the computer program is executed by a processor, the method for configuring the reconfigurable PUF based on the device with the SOT effect according to claim 2 is implemented.

18. A computer-readable storage medium, wherein the computer-readable storage medium is stored with a computer program, wherein when the computer program is executed by a processor, the method for configuring the reconfigurable PUF based on the device with the SOT effect according to claim 3 is implemented.

19. A computer-readable storage medium, wherein the computer-readable storage medium is stored with a computer program, wherein when the computer program is executed by a processor, the method for configuring the reconfigurable PUF based on the device with the SOT effect according to claim 4 is implemented.

* * * * *